(12) United States Patent
Takenaga et al.

(10) Patent No.: US 7,817,257 B2
(45) Date of Patent: Oct. 19, 2010

(54) METHOD FOR MEASURING A DIFFERENTIAL MODE DELAY OF A MULTIMODE OPTICAL FIBER

(75) Inventors: Katsuhiro Takenaga, Sakura (JP); Ning Guan, Sakura (JP); Shoichiro Matsuo, Sakura (JP); Kuniharu Himeno, Sakura (JP); Koichi Harada, Sakura (JP)

(73) Assignee: Fujikura Ltd., Tokyo (JP)

( * ) Notice: Subject to any disclaimer, the term of this patent is extended or adjusted under 35 U.S.C. 154(b) by 1095 days.

(21) Appl. No.: 10/587,303

(22) PCT Filed: Jan. 26, 2005

(86) PCT No.: PCT/JP2005/001007
§ 371 (c)(1), (2), (4) Date: Jul. 26, 2006

(87) PCT Pub. No.: WO2005/071381
PCT Pub. Date: Aug. 4, 2005

(65) Prior Publication Data
US 2007/0159620 A1      Jul. 12, 2007

(30) Foreign Application Priority Data
Jan. 27, 2004   (JP) .............................. 2004-018512

(51) Int. Cl.
G01N 21/00      (2006.01)
(52) U.S. Cl. ..................................................... 356/73.1

(58) Field of Classification Search ................. 356/73.1, 356/324; 333/155; 398/29
See application file for complete search history.

(56) References Cited

U.S. PATENT DOCUMENTS

| 7,194,155 B1* | 3/2007 | Kahn et al. | 385/27 |
| 2003/0128942 A1 | 7/2003 | DiGiovanni et al. | |
| 2003/0228103 A1* | 12/2003 | Ohira et al. | 385/37 |

FOREIGN PATENT DOCUMENTS

| JP | 60-214235 A | 10/1985 |
| JP | 5-248996 A | 9/1993 |
| JP | 2002-64430 A | 2/2002 |
| JP | 2002-257683 A | 9/2002 |
| JP | 2002-541474 A | 12/2002 |
| JP | 2003-195085 A | 7/2003 |

OTHER PUBLICATIONS

Pepeljugoski, P., et al. "15.6-Gb/s Transmission over 1 km of next generation multimode fiber", May 2002, Photonics Technology Letters, IEEE. vol. 14, Issue 5, p. 717-719.*

(Continued)

*Primary Examiner*—Tarifur Chowdhury
*Assistant Examiner*—Tara S Pajoohi
(74) *Attorney, Agent, or Firm*—Sughrue Mion, PLLC

(57) ABSTRACT

A method for measuring a multimode optical fiber includes: monitoring a temperature change within a measurement time in a DMD measurement of the multimode optical fiber, where the DMD measurement is carried out in an environment in which a magnitude of temperature change is controlled.

10 Claims, 3 Drawing Sheets

OTHER PUBLICATIONS

Zhou et al., "A study on temperature and humidity dependence of PMD", Technical Report of IEICE, Sep. 27, 2002, pp. 35-38, vol. 102, No. 357, The Institute of Electronics, Information and Communication Engineers, Tokyo, Japan.

"Optical Fibres—Part 2-10: Product Specifications—Sectional specification for category A1 multimode fibres" IEC 60793-2-10, Mar. 2002, pp. 1-43, First edition, International Electrotechnical Commission, Geneva, Switzerland.

Galtarossa et al., "Improving the Accuracy of the Wavelength-Scanning Technique for PMD Measurements", IEEE Photonics Technology Letters, Feb. 2000, pp. 184-186, vol. 12, No. 2, IEEE.

Kato et al., "Temperature Dependence of Chromatic Dispersion in Various Types of Optical Fibers", Optical Fiber Communication Conference, Nov. 2000, pp. 104-106, vol. 1.

"Differential Mode Delay Measurement of Multimode Fiber in the Time Domain", TIA-455-220-A, Jan. 2003, Telecommunications Industry Association.

IEC PAS 60793-1-49: "Optical fibres—Part 1-49: Measurement methods and test procedures 0 Differential Mode Delay", May 2005.

Shin-Etsu Quartz Products Co., Ltd., Quartz Glass Technical Guide—2 Optical Properties of Quartz Glass, p. 7. (http://www.sqp.co.jp/seihin/catalog/pdf/g2.pdf).

Shin-Etsu Quartz Products Co., Ltd., Quartz Glass Technical Guide—1 Chemical and Physical Properties of Quartz Glass, p. 7. http://www.sqp.co.jp/seihin/catalog/pdf/g1.pdf.

Shin-Etsu Quartz Products Co., Ltd., "Quartz Glass Technical Guide—1 Chemical and Physical Properties of Quartz Glass", p. 7, Tokyo, Japan, Oct. 1, 2005. (available at: http://www.sqp.co.jp/seihin/catalog/pdf/g1.pdf).

Shin-Etsu Quartz Products Co., Ltd., "Quartz Glass Technical Guide—2 Optical Properties of Quartz Glass", p. 7, Tokyo, Japan, Oct. 1, 2005. (available at: http://www.sqp.co.jp/seihin/catalog/pdf/g2.pdf).

The Institute of Electrical and Electronics Engineers, Inc. (IEEE), "802.3ae: IEEE Standard for Information Technology—Telecommunications and information exchange between systems—Local and metropolitan area networks—Specific requirements, Part 3", pp. 401-443, New York, NY Aug. 30, 2002.

International Electrotechnical Commission (IEC), "IEC/PAS 60793-1-49 Edition 1.0, Pre-Standard Optical fibres—Part 1-49: Measurement methods and test procedures—Differential mode delay", Geneva Switzerland, May 2005.

International Electrotechnical Commission (IEC), "IEC 60793-2-10 Ed. 2.0: Optical Fibres—Part 2-10: Product specifications—Sectional specification for category A1 multimode fibres", Geneva, Switzerland Jul. 23, 2004.

* cited by examiner ness Co., Ltd., Quartz Glass Technical Guide—1 Chemical and Physi
METHOD FOR MEASURING A DIFFERENTIAL MODE DELAY OF A MULTIMODE OPTICAL FIBER This application claims priority from PCT Application No. PCT/JP2005/001007, filed Jan. 26, 2005, and from Japanese Patent Application No. 2004-018512, filed Jan. 27, 2004, which applications are incorporated herein by reference.

TECHNICAL FIELD

The present invention relates to a method for accurately measuring characteristics of a multimode optical fiber. Measuring the differential mode delay (DMD) is a technique for evaluating a broadband multimode optical fiber. The present invention enables a measurement of the DMD while reducing the effects of a change in the measurement environment, which allows for accurate measurements.

BACKGROUND ART

In recent years, the DMD measurement technique has been standardized as a method for evaluating a broadband graded-index (GI) optical fiber. With this measurement, a broadband GI optical fiber that can propagate over a distance of 300 m at 10 Gbps can be assured, as stipulated by the International Electrotechnical Commission (IEC) standard.

For this reason, performing a DMD measurement with high accuracy is very important from the standpoint of quality assurance. The IEC measurement standard stipulates the measurement accuracy as follows: a variation in the measurement shall be 5% or less of the measured DMD value.

Non-patent Document 1: IEEE 802.3ae
Non-patent Document 2: IEC/PAS 60793-1-49
Non-patent Document 3: TIA-455-220
Non-patent Document 4: Shin-Etsu Quartz Products Co., Ltd., Quartz Glass Technical Guide—1 Chemical and Physical Properties of Quartz Glass, p. 7. (http://www.sqp.co.jp/seihin/catalog/pdf/g1.pdf)
Non-patent Document 5: Shin-Etsu Quartz Products Co., Ltd., Quartz Glass Technical Guide—2 Optical Properties of Quartz Glass, p. 7. (http://www.sqp.co.jp/seihin/catalog/pdf/g2.pdf)
Non-patent Document 6: IEC 60793-2-10
Patent Document 1: Japanese Unexamined Patent Application, First Publication No. 2003-195085

DISCLOSURE OF INVENTION

Problem to be Solved by the Invention

The conventional art does not describe any specific methods for carrying out DMD measurements with high accuracy. The present inventors actually carried out DMD measurements and studied whether or not any problems arose in terms of the measurement accuracy.

As a result, a problem was found in that a conventional DMD measurement cannot be carried out accurately because the refractive index and the length of an optical fiber are changed due to a change in temperature of the optical fiber during the DMD measurement.

This is caused by even a slight temperature change, and it is a significant problem in measurements and evaluation of the DMD.

The present invention was made in view of the above-mentioned background, and an object thereof is to provide a precise measurement method which measures and evaluates characteristics of a multimode optical fiber, and improves the accuracy of a DMD measurement of an optical fiber.

Means for Solving the Problem

In order to achieve the above-identified object, the present invention provides a method for measuring a multimode optical fiber comprising: monitoring a temperature change within a measurement time in a DMD measurement of the multimode optical fiber, wherein the DMD measurement is carried out in an environment in which a magnitude of temperature change is controlled.

In the present invention, it is preferable that the absolute value of the product of the measurement time and the rate of temperature change during the measurement of the measured fiber be 0.4° C. or less. Furthermore, it is more preferable that the absolute value of the product of the measurement time and the rate of temperature change during the measurement of the measured fiber be 0.3° C. or less.

In the present invention, it is preferable that the DMD measurement be carried out so that the absolute value of the product of the measurement time and the rate of temperature change during the measurement of the measured fiber be small.

In this case, it is more preferable that the measurement be carried out in an environment in which a rate of temperature change of the ambient environment is controlled to ±1.0° C. hour or less.

In the method according to the present invention, the DMD measurement may be carried out by reducing the measurement time so that the absolute value of a product of the measurement time and the rate of change in temperature of the fiber to be measured during the measurement is 0.4° C. or less.

In this case, it is preferable that the measurement time be set within 10 minutes, and it is more preferable that the measurement time be set within 3 minutes.

Furthermore, in the present invention, the DMD measurement may be carried out in an environment in which the temperature change of the ambient environment is controlled so that the product of the measurement time and the rate of temperature change during the measurement of the measured fiber is 0.4° C. or less, and the measurement time is reduced.

Furthermore, in the present invention, it is preferable that the DMD measurement be carried out after placing the fiber to be measured in the measurement environment until the temperature of the optical fiber substantially equals the temperature of the measurement environment before carrying out the DMD measurement.

Advantageous Effects of the Invention

According to the present invention, in a DMD measurement of a multimode optical fiber, by performing the measurement while maintaining the absolute value of the product of the measurement time and the rate of change in temperature of the fiber to be measured so as to be smaller, it becomes possible to perform the DMD measurement with high accuracy.

Furthermore, by controlling the temperature of the ambient environment so as to maintain the measurement temperature change at a small value, it becomes possible to measure the DMD with high accuracy.

Furthermore, it becomes possible to reduce the effect of temperature change of the measured fiber by reducing the measurement time, and it becomes possible to measure the DMD with high accuracy.

As described above, carrying out a DMD measurement of a multimode optical fiber with high measurement accuracy enables a high-level of quality assurance of products, as well as enhancing the production yield.

DESCRIPTION OF THE REFERENCE SYMBOLS

Figure 1:
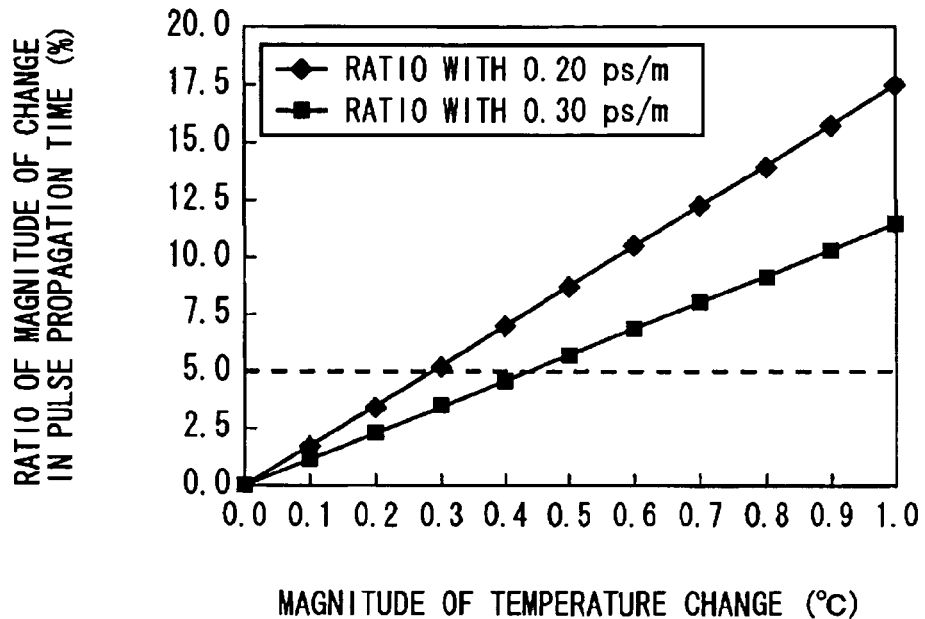
FIG. 1 is a graph indicating the relationship between the magnitude of temperature change and the ratio of magnitude of change in the pulse propagation time of a multimode optical fiber.

1 . . . optical fiber to be measured (multimode optical fiber), 2 . . . core region, 3 . . . cladding region, and 4 . . . excitation position.

BEST MODE FOR CARRYING OUT THE INVENTION

A method for measuring a multimode optical fiber according to the present invention is characterized in that a DMD measurement is made under the condition in which the absolute value of a product of the measurement time and the rate of change in temperature of the fiber to be measured during the measurement becomes 0.4° C. or less, and preferably 0.3° C. or less.

The cause of the influence of temperature change on the DMD measurement is the change in the refractive index and the length of the optical fiber because the optical fiber to be measured is affected by temperature change. That is, it is caused because the time of propagation through the optical fiber is changed between before and after the temperature change due to the temperature change. In the DMD measurement, pulses are measured in a time region, and the variation in time directly affects the measurements. The change due to the temperature change cannot be distinguished from the change due to the modal dispersion which is measured in the DMD measurement. For the above reason, the results of DMD measurements are influenced by temperature change.

First, the influence of temperature change on DMD measurements is determined quantitatively by means of calculations.

The calculations and the calculation results will be described below.

Assume that an optical fiber has a length L and a refractive index n. A length L' and a refractive index n' when the temperature is changed by $\Delta T$ will be expressed using a linear expansion index $\alpha$ and a refractive index temperature index $\beta$ by the following Formulae (1) and (2):

Formula 1
$$L' = L + \Delta L = L + \alpha \cdot L \cdot \Delta T \quad (1)$$

Formula 2
$$n' = n + \Delta n = n + \beta \cdot \Delta T \quad (2)$$

Furthermore, the time for light to propagate in the fiber: $t(L, n)$, $t(L+\Delta L, n+\Delta n)$ before the temperature change and after the temperature change are expressed by the following Formulae (3) and (4), where c is the speed of light. Strictly speaking, each mode has a different propagation speed within an optical fiber, and is $c/n_g$ when the group refractive index of a certain mode is $n_g$. Such a slight difference is negligible in this case because only the difference the propagation time is considered. Thus, Formulae (3) and (4) were derived assuming that $n_g \approx n$.

Formula 3
$$t(L, n) = \frac{L \cdot n}{c} \quad (3)$$

Formula 4
$$t(L + \Delta L, n + \Delta n) = \frac{(L + \Delta L) \cdot (n + \Delta n)}{c} \quad (4)$$

Thus, the difference $\Delta t$ of the time for light to propagate in a fiber before and after the temperature change will be the following Formula (5). Formula (5) is a formula obtained by approximating the last term in the right-hand side in the first line by assuming that it is negligible and rearranging the equation.

Formula 5
$$\Delta t = t(L + \Delta L, n + \Delta n) - t(L, n) \quad (5)$$
$$= \frac{1}{c}\{L \cdot \Delta n + n \cdot \Delta L + \Delta L \cdot \Delta n\}$$
$$\approx \frac{1}{c}\{L \cdot \Delta n + n \cdot \Delta L\}$$

Here, in order to satisfy "a variation in the measurement shall be 5% or less of the measured DMD value" required by the measurement standard (Non-patent Document 2), the following Formula (6) is derived. In the following formula, $DMD_{min}$ (ps/m) is a minimum DMD value to be assumed.

Formula 6
$$\frac{|\Delta t|}{DMD_{min} \times L} \leq 0.05 \quad (6)$$

Thus, the extent of maximum temperature change $\Delta T_{max}$ can be determined from the conditions expressed in Formula (6). Here, $\Delta T_{max}$ is the absolute value of the maximum variation that satisfies Formula (6).

Given the above, it is required that the measurement time $t_{measurement}$ and the rate of temperature change of the optical fiber during measurement $K_{fiber}$ satisfy the following Formula (7).

Formula 7
$$|t_{measurement} \times K_{fiber}| \leq \Delta T_{max} \quad (7)$$

The specific value of $\Delta T_{max}$ is determined by the measured $DMD_{min}$ and $\alpha$, $\beta$, and n in Formulae (1)-(5).

In the following, it is assumed that an optical fiber to be measured is a silica-based optical fiber, and the specific value is determined. As the linear expansion index α, the refractive index temperature index βA, and the refractive index n, α=0.51×10$^{-6}$ (K$^{-1}$), β=9.8×10$^{-6}$ (K$^{-1}$), and n=1.45250 are assigned, which are the values of synthetic silica at a wavelength of 850 nm (see Non-patent Documents 4 and 5). The calculation was carried out by varying the temperature change from 0° C. to 1.0° C. The results of the calculation of the left-hand side of Formula (6) are shown in FIG. 1. In this case, the calculation was carried out for two values of $DMD_{min}$: 0.30 ps/m and 0.20 ps/m. These $DMD_{min}$ values were selected because they are considered appropriate in view of the measurement accuracy required by the DMD measurement (see the following supplementary explanation regarding DMD measurements). From the results of the calculation, it can be concluded that in order to maintain the measurement deviation within 5% or less of $DMD_{min}$, the allowable temperature change should be maintained within ±0.4° C. or ±0.3° C. when the $DMD_{min}$ is 0.30 ps/m or 0.20 ps/m, respectively.

In the following, a solution will be discussed based on these results.

A first method according to the present invention is to carry out a DMD measurement where the temperature of the ambient environment is controlled, thereby reducing the measurement error in the DMD measurement.

As an example to show the effectiveness of this first method, the following measurement was carried out. Pulsed light having a wavelength of 850 nm was made incident on the center of the optical fiber to be measured using a single-mode optical fiber, and the time waveform of the exit pulse was measured for 10 minutes at intervals of 2 minutes, thereby measuring the deviation from the pulse center which was measured first. This experiment was not for measuring the DMD directly, but for determining the DMD by making the pulsed light propagate through the fiber to be measured with Δt in Formula (5). For the measurement, using silica-based 50/125 GI optical fibers of 3000 m, which are compliant with IEC 60793-2-10 Ala.2 (see Non-patent Document 6), the measurement ambient temperature was controlled so that the rate of change in the temperature became about +1.0° C./hour (hereinafter, sometimes abbreviated as "h"), +2.0° C./h, +3.0° C./h, +4.0° C./h, or +5.0° C./h. The measurement results are shown in Table 1.

TABLE 1

| Measurement time [min.] | Magnitude shift of center of pulse [ps] | | | | |
|---|---|---|---|---|---|
| | 1.0° C./h | 2.0° C./h | 3.0° C./h | 4.0° C./h | 5.0° C./h |
| 0 | 0.0 | 0.0 | 0.0 | 0.0 | 0.0 |
| 2 | 4.1 | 7.7 | 11.6 | 17.5 | 19.2 |
| 4 | 8.5 | 16.7 | 26.9 | 33.3 | 36.4 |
| 6 | 10.7 | 24.7 | 33.3 | 47.1 | 63.8 |
| 8 | 17.1 | 32.7 | 44.8 | 71.7 | 81.3 |
| 10 | 17.9 | 39.8 | 64.3 | 76.2 | 99.9 |

Furthermore, the magnitude of shift of the center of the pulse per unit time was determined from these results. Assuming the measurement time $t_{measurement}$ of 10 minutes, the ratios of the magnitude of change of the pulse (%) with respect to $DMD_{min}$ were determined when $DMD_{min}$=0.30 ps/m or 0.20 ps/m. The results are shown in FIG. 2.

Figure 2:
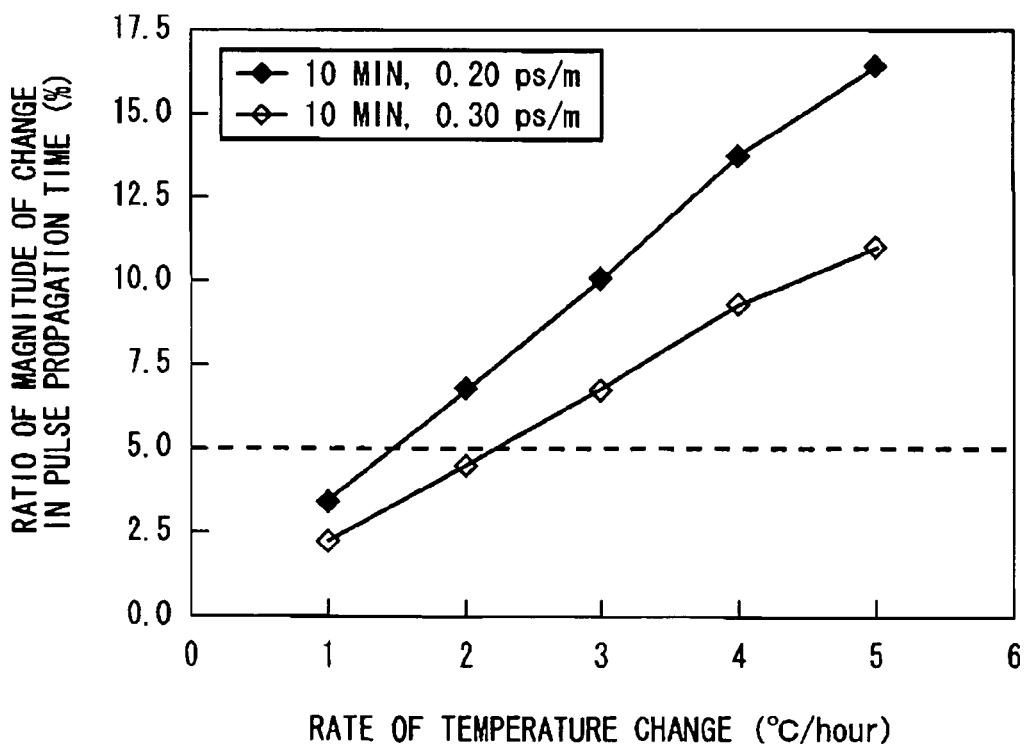
FIG. 2 is a graph indicating the relationship between the rate of temperature change and the ratio of magnitude of change in the pulse propagation time of a multimode optical fiber when a measurement time is 10 minutes.

The values in FIG. 2 are values determined from the average of the five measurements shown in Table 1. When the values were expressed by a formula, the following Formula (8) was obtained. In the following Formula (8), Δt represents $t_{measurement}$×(magnitude of shift of the pulse per unit time).

Formula 8

$$\frac{|\Delta t|}{DMD_{min} \times L} \quad (8)$$

Here, as the magnitude of shift of the pulse, values normalized with the lengths of the fiber to be measured were used. The results indicate that deviations in the measurements of 5% or less with respect to $DMD_{min}$ can be obtained when the measurement time was 10 minutes and the rate of change in the temperature was about +1.0° C./h. In contrast, it was indicated that the deviation in the measurements exceeded 5% with respect to $DMD_{min}$ by far when the rate of change in the temperature was +3.0° C./h.

A second method of the present invention is to reduce the measurement error in the DMD measurement by reducing the measurement time.

As examples of this second method, in the experiment of the above-described first example, assuming that the measurement time was 10 minutes, 5 minutes, or 3 minutes, the ratios of the magnitude of change in the pulse propagation time with respect to the temperature change were determined, as in the case shown in FIG. 2. The results are shown in FIG. 3.

These results indicate that the influence on the DMD measurement was reduced when the measurement time was reduced, and that the measurement accuracy can be maintained to 5% or less when the measurement time was 3 minutes even with a rate of change in temperature of 5.0° C./h.

A third method of the present invention is to reduce the measurement accuracy by combining the above-described first method with the second method.

Figure 3:
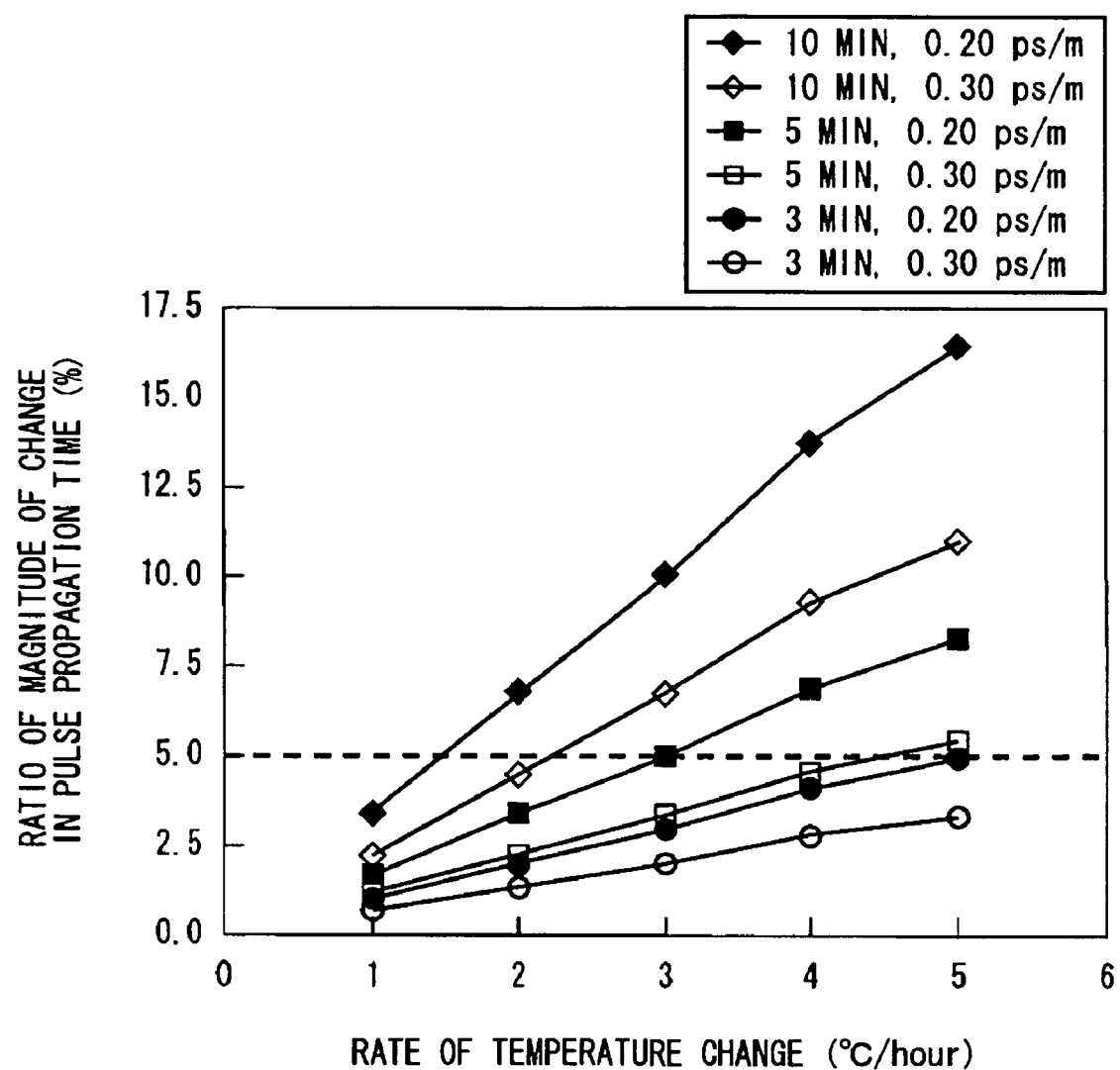
FIG. 3 is a graph indicating the relationship between the rates of temperature change and the respective ratios of magnitude of change in the pulse propagation time of a multimode optical fiber when measurement times are 10 minutes, 5 minutes, and 3 minutes.

As an example of the third method, by checking the case in which the rate of change in the temperature is 1.0° C./h and the measurement time is 3 minutes in FIG. 3 which is the example of the second method, it can be seen that the measurement accuracy is 1% or less.

These results indicate that the combination of the first method and second methods enables a DMD measurement with very high accuracy.

As a second example of the third method, the actual DMDs were measured. In the measurements, two types of fiber exhibiting very small DMD values of 0.15 ps/m or 0.24 ps/m at a wavelength of 850 nm when the radius was between 0 and 23 μm were used. The DMD value is the average of ten measured values using the third method with a measurement time of 3 minutes in the environment in which the rate of change in the temperature was ±1.0° C./h or less. In the following discussion, values determined under these conditions will be referred to as $DMD_{ideal}$. Furthermore, DMD values measured under conditions different from the conditions for $DMD_{ideal}$ will be referred to as $DMD_{measurement}$. Values of measurement errors to be evaluated hereinafter will be values determined using the following Formula (9).

Formula 9

$$\frac{DMD_{measurement} - DMD_{ideal}}{DMD_{ideal}} \times 100 \ [\%] \quad (9)$$

As measurement conditions, the following four conditions were used. Here, the rate of change in temperature of 2.0° C./h is the maximum variation in a room furnished with an air conditioning facility, and the rate of change in temperature of 4.0° C./h was an approximate variation in outdoors. It should be noted that the values exemplified here are maximum variations of temperature which were actually monitored during the measurements, and the temperature variations might vary according to reasons, such as the time period, the weather, or the like.

[1] Variation with a measurement time of 10 minutes and a rate of change in temperature of ±2.0° C./h;
[2] Variation with a measurement time of 10 minutes and a rate of change in temperature of ±4.0° C./h;
[3] Variation with a measurement time of 5 minutes and a rate of change in temperature of ±4.0° C./h;
[4] Variation with a measurement time of 3 minutes and a rate of change in temperature of ±2.0° C./h.

The results of the measurements are shown in Table 2.

TABLE 2

| $DMD_{ideal}$ | Measurement conditions | | | |
|---|---|---|---|---|
| | [1] | [2] | [3] | [4] |
| 0.15 | +7.5% | −12.5% | +5.8% | +2.1 |
| 0.24 | +4.6% | +8.0% | +4.2% | −1.3% |

[1] Variation with measurement time of 10 minutes and rate of change in temperature of ±2.0° C./h
[2] Variation with measurement time of 10 minutes and rate of change in temperature of ±4.0° C./h
[3] Variation with measurement time of 5 minutes and rate of change in temperature of ±4.0° C./h
[4] Variation with measurement time of 3 minutes and rate of change in temperature of ±2.0° C./h The results in Table 2 indicate that the measurement error becomes smaller when the measurement time is reduced and the temperature change is small.

Furthermore, since the transmission loss of the optical fiber is significant at about 2.4 db/km at a wavelength of 850 nm in the DMD measurements, it is required that the number of measurements for calculating the average be increased in order to reduce the measurement noise, which requires a longer measurement time. In this example, as a method for reducing the measurement time, the output from the light source was increased and a detector with a high measurement sensitivity was used, which solved the issue. Other methods for reducing the measurement time are possible, such as increasing the data sampling rate of the detector.

Supplementary Explanation Regarding DMD Measurement

The DMD measurement is a measurement method which is defined in standard IEC/PAS 60793-1-49 (see Non-patent Document 2), and is a method for measuring the modal dispersion of a multimode optical fiber.

The differential mode delay (DMD) is a delay time difference between modes, and is defined as the difference in the pulse delay time between the fastest mode and the slowest mode in the radial direction offset of a fiber to be measured within a certain range (between $R_{inner}$ and $R_{outer}$).

DMD Measurement Method

Figure 4:
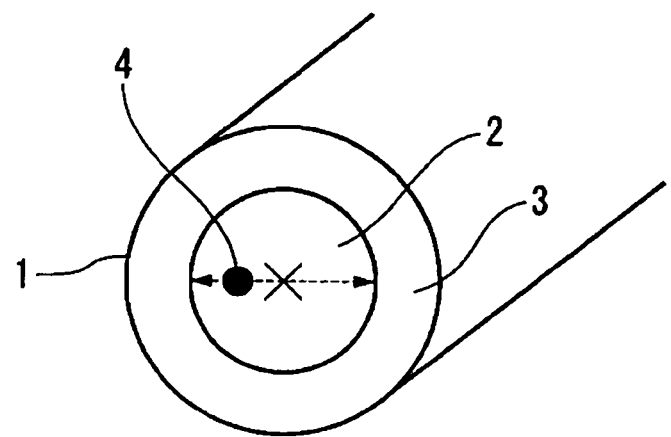
FIG. 4 is a perspective view of an optical fiber showing the excitation position of an optical fiber to be measured in a DMD measurement of a multimode optical fiber.
Figure 5:
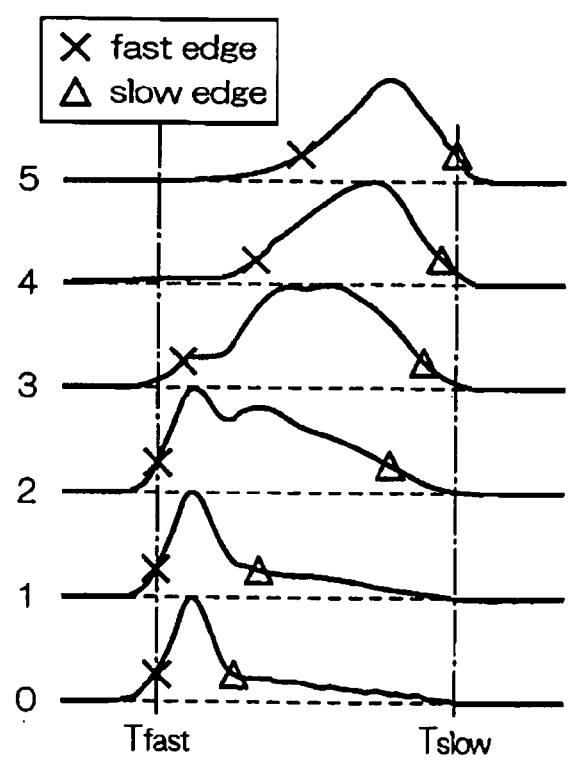
FIG. 5 is a graph exemplifying the DMD measurement waveform in a DMD measurement of a multimode optical fiber.

As shown in FIG. 4, an optical fiber 1 to be measured has a core region 2 and a cladding region 3 provided at the outer periphery of the core region 2. Light is incident on a predetermined position (an excitation position 4) in the core region 2 of the optical fiber 1 to be measured from an excitation fiber (a single-mode optical fiber), and the pulse response is measured. While shifting this excitation position 4 in the radial direction from $R_{inner}$=0 μm (the center of the core) to $R_{outer}$=23 μm, the pulse response at each point is measured. The pulse response is recorded for each offset position, as shown in FIG. 2.

DMD Calculation Method

From the data obtained from the measurements, the points corresponding to 25% of the peak power of the offset are defined as a fast edge and a slow edge. The fastest value among fast edge values is defined as $T_{fast}$ and the slowest value among slow edge values is defined as $T_{slow}$ within a predetermined offset range (R of between 1 and 5 μm in FIG. 2). The value of DMD in this case is expressed by the following Formula (10).

Formula 10

$$DMD=(T_{slow}-T_{fast})-\Delta T_{REF} \quad (10)$$

where $\Delta T_{REF}$ is defined from the pulse duration $\Delta_{pulse}$ of the incident pulse and the broadening $\Delta t_{chrom}$ due to the chromatic dispersion, and is expressed by the following Formula (11).

Formula 11

$$\Delta T_{REF}=(\Delta T^2_{pulse}+\Delta t^2_{chrom})^{1/2} \quad (11)$$

For the DMD calculated in the above manner, the range (inner) in which the radial direction offset is within the range of R of between 5 μm and 18 μm and the range (outer) in which it is within the range of R of between 0 μm and 23 μm are determined.

Standard of DMD

An optical fiber compliant with A1a.2 of IEC 60793-2-10 (see Non-patent Document 6) which can propagate 300 m at 10 Gbps shall have two DMDs determined by the calculation method of the DMD and satisfying one of the six templates in Table 3.

TABLE 3

| Template number | Inner mask DMD (ps/m) for $R_{INNER}$ = 5 μm to $R_{OUTER}$ = 18 μm | Outer mask DMD (ps/m) for $R_{INNER}$ = 0 μm to $R_{OUTER}$ = 23 μm |
|---|---|---|
| 1 | ≦0.23 | ≦0.70 |
| 2 | ≦0.24 | ≦0.60 |
| 3 | ≦0.25 | ≦0.50 |
| 4 | ≦026 | ≦0.40 |
| 5 | ≦0.27 | ≦0.35 |
| 6 | ≦0.33 | ≦0.33 |

The invention claimed is:

1. A method for measuring a differential mode delay (DMD) of a multimode optical fiber comprising:
   monitoring a temperature of the multimode optical fiber, during a measurement time of the DMD of the optical fiber;
   measuring a change of temperature of the optical fiber during the measurement time; and
   controlling the temperature of the optical fiber such that, during the measurement time, $\Delta T_{max}$, which is an absolute value of a maximum change of temperature of the optical fiber satisfies:

$$\Delta T_{max} \leq \frac{0.05 \cdot c \cdot DMD_{min}}{\beta + \alpha \cdot n}$$

wherein α is a linear expansion index of the optical fiber, β is a refractive index temperature index of the optical fiber, n is a refractive index of the optical fiber, c is the speed of light in a vacuum, and $DMD_{min}$ is DMD of the fiber.

2. The method for measuring a differential mode delay (DMD) of a multimode optical fiber according to claim 1, wherein the change of temperature of the optical fiber is 0.4° C. or less.

3. The method for measuring a differential mode delay (DMD) of a multimode optical fiber according to claim 1, wherein the change of temperature of the optical fiber is 0.3° C. or less.

4. The method for measuring a differential mode delay (DMD) of a multimode optical fiber according to claim 1, wherein the predetermined range is calculated such that a rate of temperature change of the ambient environment is controlled to ±1.0° C./hour or less.

5. The method for measuring a differential mode delay (DMD) of a multimode optical fiber according to claim 1, wherein the measurement time is not more than 10 minutes.

6. The method for measuring a differential mode delay (DMD) of a multimode optical fiber according to claim 1, wherein the measurement time is not more than 3 minutes.

7. The method for measuring a differential mode delay (DMD) of a multimode optical fiber according to claim 1, wherein the predetermined range is calculated such that a rate of temperature change of the ambient environment is controlled to ±1.0° C./hour or less and the measurement time is not more than 10 minutes.

8. The method for measuring a differential mode delay (DMD) of a multimode optical fiber according to claim 1, further comprising:
prior to the measurement time of the DMD of the optical fiber, placing the optical fiber in a measurement environment until the temperature of the optical fiber substantially equals a temperature of the measurement environment.

9. The method for measuring a differential mode delay (DMD) of a multimode optical fiber according to claim 1, wherein the measurement time is not more than 5 minutes.

10. The method for measuring a differential mode delay (DMD) of a multimode optical fiber according to claim 1, wherein the predetermined range is calculated such that a rate of temperature change of the ambient environment is controlled to ±5.0° C./hour or less.

* * * * *